2,989,399
PROCESS OF PREPARING A WHITE FLOUR DOUGH MIX AND COMPOSITION THEREFOR

Sharon R. Ehle, Wilmington, Del., assignor to E. I. du Pont de Nemours and Company, Wilmington, Del., a corporation of Delaware
No Drawing. Filed Aug. 22, 1958, Ser. No. 756,532
4 Claims. (Cl. 99—90)

This invention relates to new food products, and is more particularly concerned with a food-fortifying composition suitable for supplementing the protein in baked goods, and with high protein bread comprising this composition in combination with the usual bread ingredients.

It is known that baked goods, such as bread, must contain at least 20% protein on a dry weight basis in order for the quantity of protein to be in the meat protein class. The essential amino acids must also be present in sufficient quantity and proportions for effective assimilation and to make the protein quality equivalent to that of milk and meat. Although breads are prepared with a wide variety of compositions, by far the largest amount consumed in this country is white bread made with wheat flour. A typical American loaf is prepared from 100 parts by weight of white wheat flour, 60 parts water, 2.0 parts yeast, 0.3 part yeast food, a small amount of fungal enzyme, 4 parts shortening, 4 parts nonfat dry milk, 6 parts sugar and 2 parts salt. The bread usually contains a mold inhibitor, such as calcium propionate, and may be enriched with vitamins. Since most wheat flour has a protein content of only 12–14%, and the essential amino acid content is inadequate as to nutritionally effective quantities of lysine, the protein quality and content of this bread is far below that of proteins in the milk-meat class.

Since nonfat dry milk solids are used in preparing the bread and are rich in protein, it might be thought that the quantity could be increased sufficiently to provide a high protein bread. However, attempts to prepare a 20% protein bread in this way have not succeeded in producing a product which is acceptable in place of the unfortified bread. Nonfat dry milk is available which contains 35.6% protein. In order to attain 20% protein (dry weight) in the bread, using nonfat dry milk as the only supplementary source of protein, a minimum of 19 parts per 100 parts of wheat flour must be added. My experiments have shown that addition of more than 6 parts nonfat dry milk per 100 parts flour has caused progressive darkening, thickening and toughening of the crust, diminished loaf volume, coarser grain and rougher texture, and less soft crumb. Bread fortified with 20 parts of nonfat dry milk per 100 parts flour was sour and unpalatable. The crust had a very bitter taste. Furthermore, the dough was difficult to mix or manipulate properly in standard procedures for bread preparation. Similar difficulties were encountered with high protein milk products (70–90% protein), such as lactalbumin (73–76% protein) or calcium caseinate (88–90% protein). Even though a smaller proportion of either of the latter is required to obtain the desired high protein content, a commercially acceptable loaf could not be produced with either one.

Wheat gluten is available which contains 70–75% protein. Small additions of this material have a desirable effect on the bread structure, but as much as 4 parts per 100 parts of wheat flour caused an undesirable shiny open grain in the bread. In addition, wheat gluten is deficient in lysine in the same way as wheat flour. The above proportions would require the addition of 0.315 part lysine monohydrochloride to correct this deficiency, i.e., 0.021 times the total weight of wheat protein. Gluten contributes to the taste of breads. Bread fortified to a 20% protein content with his combination was found unsatisfactory as to taste, cost and appearance in comparison with the usual commercial product.

An object of this invention is to provide high protein bread, including bread of meat-milk nutritional quality, which compare favorably in every other respect with the typical American loaf described above. Another object is to provide a high protein composition suitable for use in preparing such bread, and in fortifying other bakery products without undesirable effect on their properties. Other objects will become apparent from the specification and claims.

In accordance with this invention it has been unexpectedly found that a combination of the above mentioned protein-rich materials can be used to fortify the typical American loaf to 20% protein (dry basis) or higher without adverse effect on the taste, appearance, physical quality or other properties of the bread, even though this could not be accomplished with any one of the materials alone. This highly desirable result is accomplished when the protein-fortifying materials are in the proportions of 8 to 14 parts nonfat dry milk solids, 2 to 8 parts high protein milk product containing at least 70% protein, e.g., lactalbumin or a casein salt, and 2 to 6 parts wheat gluten.

When used to fortify a bread, these materials are mixed in the above proportions with the other bread ingredients in an amount providing a total of at least 20 and preferably not more than 28 parts protein per 100 parts of dry ingredients. For example, the addition of 9 to 11 parts nonfat dry milk, 2 to 4 parts lactalbumin or calcium caseinate and 4 to 6 parts wheat gluten per 100 parts of flour containing 12.7% protein will provide a high protein bread containing at least 20% protein on a dry basis. The lysine deficiency of the wheat protein should also be corrected by adding lysine, as such or in the form of lysine monohydrochloride, lysine propionate, or other compound. Preferably an amount should be added equivalent to 0.2 to 0.7 parts of L-lysine per 12 parts of wheat protein.

The above fortifying ingredients may be added separately to the usual bread ingredients or can be added as a premixed composition. When added separately the proportions indicated above must nevertheless be maintained in order to obtain the highly desirable 20% protein bread of this invention. When a premixed fortifying composition is used, the composition can include other ingredients in addition to the nonfat dry milk, high protein milk product and wheat gluten. The composition may include lysine, flour or other dry materials used in bakery products. The fortifying ingredients can be incorporated in a ready mix of the type sold for use in homes, which uses baking powder instead of yeast and requires only the addition of water.

Protein bread may be prepared commercially by the sponge-dough, straight dough, or continuous fermentation processes. In the sponge-dough process, the supplemental proteins may be added to the dough or it may be preferable to add the supplemental wheat gluten and high protein milk product separately to the sponge. A convenient premixed composition for fortifying commercial bread combines the fortifying ingredients in such proportions that the mixture contains 50% to 60% protein and 4.5% to 8.0% L-lysine. For example, such a composition containing 55% protein and 5.0% L-lysine can be added to the conventional mix in the proportions of 30 parts per 100 parts of wheat flour (12% protein) to give a bread containing more than 20% protein (dry basis) and a proper lysine balance.

The wheat gluten should be of the type customarily used in bread, i.e., the gluten should not be denatured or it will not have the gas retention properties which confer the desired volume and cell structure to the loaf. Further, the nonfat dry milk should be the spray-dried bakers grade, although the roller dried material may be used if it can be shown by analysis that the amino acids are in the expected proportions in the protein.

It is sometimes advantageous to add 0.5 lb./100 lbs. flour of active dry yeast to the dough to increase the acidity of the bread and thereby decrease crust carmelization. Further, increasing the time of fermentation can also increase the acidity of the bread. Concomitant with this increased acidity by natural fermentation is a desirable flavor in the bread.

The following examples, in which parts are by weight, illustrate preferred embodiments of the invention:

Example 1

In the production of high protein bread by the sponge-dough process, a sponge is prepared, containing 70 parts of wheat flour (12% protein), 42 parts of water, 2.5 parts of yeast, ½ part of yeast food (starch and minerals) and a small amount of fungal enzyme, and is set at 78° F. to ferment for 4¼ hours. It is then made into a dough with 30 parts wheat flour, 28 parts water, 6 parts sugar, 2 parts shortening and 2 parts salt.

A fortifying mixture of 5 parts wheat gluten, 10 parts nonfat dry milk, 0.33 part L-lysine monohydrochloride and 3 parts calcium caseinate is added to the dough. The dough is mixed for 8 to 10 minutes at 80° F., and allowed to rise for a floor-time of 25 minutes. The dough is baked in the usual manner to yield a bread having good volume, close grain, soft texture and good taste. The bread analyzes 3.52% nitrogen and 1.18% lysine on a dry weight basis, corresponding to better than 20% protein of balanced lysine content.

A feeding study was conducted in which 21 day old male albino rats of Carworth Farms were fed either a diet of standard white bread or one containing the above mentioned protein bread. The dies were made up as follows:

|  | Diet I—Standard Bread | Diet II—Protein Bread |
| --- | --- | --- |
|  | Percent | Percent |
| Bread | 67.0 | 45.0. |
| Corn Oil | 7.2 | 9.4. |
| Vitamin Diet Fortification Mixture (mfd. by Nutritional Biochemicals Co.). | 2.2 | 2.2. |
| Salt Mixture USP No. 14 | 4.0 | 4.0. |
| α Cellulose | 5.0 | 5.0. |
| Corn Starch | Make up to 100 | Make up to 100. |

On analysis the diets showed:

|  | Diet I—Standard Bread | Diet II—Protein Bread |
| --- | --- | --- |
| Percent N (dry) | 1.66 | 1.70 |
| Percent Protein (total wt. basis) | 8.8 (N × 5.70) | 9.2 (N × 5.85) |
| Percent Fat (dry) | 10.0 | 8.4 |
| Percent H₂O | 7.21 | 7.52 |

Ten rats were picked at random for each group, so that the mean weights were the same for both groups, and the growth study was conducted for 4 weeks. The weight gain on each rat was measured at weekly intervals and the food consumption was checked twice weekly. The rats were fed ad libitum. The quality of the protein in the bread is apparent from a comparison of the protein efficiency ratios obtained on the rats. The protein efficiency ratio is defined as follows: PER=gms. weight gained divided by total gms. protein eaten. For the standard white bread the PER was found to be 1.1. For rats fed the protein bread the PER was 2.7. This value compares favorably with values in the literature for meat proteins, e.g.:

| Meat | Ave. PER | Reference |
| --- | --- | --- |
| Bacon—uncooked | 2.8 | McBride, Guthneck, Hoffert, Knickel, and Schweigert, J. Nutrition 45, 393 (1951). |
| Bacon—cooked | 2.5 | |
| Cured—Ready to eat ham | 2.7 | Dunker, Berman, Snyder and Tubiash, Food Technol. 7, 288 (1953). |
| Beef liver | 2.7 | (M. Sahyun, "Proteins and Amino Acids in Nutrition," p. 66, Reinhold Pub. Corp. N.Y. (1948). |
| Beef heart | 3.1 | |
| Beef muscle | 3.2 | |

A market survey was conducted in which residents of Wilmington, Delaware, were asked how this bread compares with the bread they are now using as to appearance, texture, aroma, taste and as toast. Preferences for the protein bread were as follows:

| Quality | Better | Same | Less | Undecided |
| --- | --- | --- | --- | --- |
|  | Percent | Percent | Percent | Percent |
| Appearance | 24 | 61 | 13 | 2 |
| Texture | 40 | 49 | 11 | nil. |
| Aroma | 13 | 72 | 7 | 8 |
| Taste | 34 | 56 | 10 | nil. |
| Toast | 40 | 45 | 9 | 6 |

In the following examples, Example 1 is repeated except for the changes indicated.

Example 2

Instead of the fortifying mixture of Example 1, a mixture of 3 parts wheat gluten, 10 parts nonfat dry milk, 0.33 part L-lysine monohydrochloride, 3 parts calcium caseinate and 0.5 part active dry yeast is added to a dough made with wheat flour containing 14% protein. After baking, the bread contains over 20% protein and the quality is comparable to that of Example 1.

Example 3

The 3 parts calcium caseinate of Example 1 is replaced with 2 parts lactalbumin to give 20% protein bread of comparable quality.

Example 4

A mixture of 5 parts wheat gluten, 8 parts nonfat dry milk, 0.33 part L-lysine monohydrochloride and 8 parts calcium caseinate is added to the dough, instead of the fortifying mixture of Example 1, to give a protein bread containing at least 20% protein, and which is comparable in quality to the bread of Example 1.

For comparison with the results obtained in accordance with this invention, a fortifying mixture of 20 parts nonfat dry milk and 0.25 part L-lysine monohydrochloride when added to 100 parts of flour (containing 12% protein), 4 parts shortening, 60 parts of water, 2 parts of salt, 6 parts of sugar, 2 parts of yeast, and .37 part of yeast food gave a sour bread which was inferior in volume, which had a thick black crust, and whose grain and texture were poor. When wheat gluten was used in this composition instead of nonfat dry milk to give 20% protein bread, undesirable large loaves with a leathery texture and a large open grain resulted. Also, the amount of L-lysine monohydrochloride had to be increased to 0.46 part per 100 parts of flour because of the lysine deficiency of the wheat products.

The invention is of principal utility in providing protein-fortified bread in a form acceptable by the public, i.e., with the appearance, texture, aroma and taste found in the typical white American loaf of wheat bread, and which had an adequately high and balanced protein content to provide protein nutritional value comparable to that of meat, milk or cheese. The invention is similarly useful in fortifying a wide variety of bakery products without undesirable effect on their properties.

Since many different embodiments of the invention

I claim:

1. A high protein composition for use in fortifying bakery products, consisting essentially of 8 to 14 parts nonfat dry milk solids, 2 to 8 parts high protein milk product selected from the group consisting of lactalbumin and calcium caseinate containing at least 70% protein, and 2 to 6 parts wheat gluten.

2. A high protein composition for use in fortifying bakery products, containing 50% to 60% protein and 4.5% to 8.0% L-lysine, the protein-containing ingredients consisting essentially of 8 to 14 parts nonfat dry milk solids, 2 to 10 parts high protein milk product selected from the group consisting of lactalbumin and calcium caseinate containing at least 70% protein, and 2 to 6 parts wheat gluten.

3. In the process of preparing a white flour dough mix and baking the mix, the improvement for substantially increasing the protein content while retaining the other desirable properties of the bread resulting from said baked mix which consists essentially of fortifying said dough mix to contain, per 100 parts white flour, 8 to 14 parts nonfat dry milk solids, 2 to 8 parts high protein milk product selected from the group consisting of lactalbumin and calcium caseinate containing at least 70% protein, and 2 to 6 parts wheat gluten.

4. In the process of preparing a white flour dough mix and baking the mix, the improvement for substantially increasing the protein content while retaining the other desirable properties of the bread resulting from said baked mix which consists essentially of fortifying said dough mix to contain 0.2 to 0.4 part L-lysine per 12 parts wheat protein and sufficient nonfat dry milk solids, high protein milk product selected from the group consisting of lactalbumin and calcium caseinate containing at least 70% protein and wheat gluten, in the proportions of 8 to 14 parts nonfat dry milk, 2 to 8 parts high protein milk product and 2 to 6 parts wheat gluten, to provide a bread containing 20% to 28% protein on a dry basis.

References Cited in the file of this patent

UNITED STATES PATENTS

| | | |
|---|---|---|
| 2,059,905 | Powers | Nov. 3, 1936 |
| 2,086,184 | Haas | July 6, 1937 |
| 2,828,207 | Fullhart | Mar. 25, 1958 |

FOREIGN PATENTS

| | | |
|---|---|---|
| 155,466 | Australia | Mar. 1, 1954 |

OTHER REFERENCES

Federal Register page 5103, Aug. 8, 1950.